United States Patent [19]
Anderson et al.

[11] Patent Number: 5,655,078
[45] Date of Patent: Aug. 5, 1997

[54] APPARATUS AND METHOD FOR ENCODING DATA IN A FIBER DATA DISTRIBUTED INTERFACE (FDDI)

[75] Inventors: Paul M. Anderson, Dripping Springs; Lloyd A. Hasley; Carol Jens, both of Austin, all of Tex.

[73] Assignee: Motorola Inc., Schaumburg, Ill.

[21] Appl. No.: 315,472

[22] Filed: Sep. 30, 1994

[51] Int. Cl.$^6$ ............................................. G06F 11/00
[52] U.S. Cl. .................... 375/295; 375/254; 341/50
[58] Field of Search ............ 364/DIG. 1 MS File, 364/DIG. 2 MS File; 341/50, 58, 52, 68; 395/180, 182.02, 200.01, 280; 375/254, 295, 317, 377, 240, 296

[56] References Cited

U.S. PATENT DOCUMENTS 5,200,979  4/1993  Harris ........................... 375/292
5,319,680  6/1994  Port et al. ..................... 375/375
5,465,272  11/1995  Smith ........................... 375/295

*Primary Examiner*—Robert B. Harrell
*Attorney, Agent, or Firm*—Keith E. Witek

[57] ABSTRACT

A fiber data distributed interface (FDDI) system uses an MLT3A encoding scheme in order to reduce DC bias or baseline wander. The MLT3A encoding scheme is a scheme wherein logical zeros are transmitted as ground voltages and logical ones are transmitted as one of either positive voltages or negative voltages depending upon past transmission history (FIG. 4) wherein the past history is recorded by a counter C or an analog circuit. MLT3A ensures that the baseline wander or DC bias returns to zero or is maintained as close to zero as possible in a timely manner so that no FDDI systems will fail from baseline wander.

27 Claims, 3 Drawing Sheets

APPARATUS AND METHOD FOR ENCODING DATA IN A FIBER DATA DISTRIBUTED INTERFACE (FDDI)

FIELD OF THE INVENTION

The present invention relates generally to data processing systems, and more particularly, to fiber data distributed interface (FDDI) data encoding.

BACKGROUND OF THE INVENTION

In fiber data distributed interface (FDDI) systems, great care is needed in order to reduce baseline wander or DC bias over time. The FDDI system is a serial communication system wherein serial bits are serially transmitted. In FDDI twisted pair systems that conform with the ANSI standard, this serial transmission over a period of time may contain an imbalance among the transmitted voltage levels resulting in a DC offset or base line wander over that period of time.

In order to reduce emissions in twisted pair FDDI the data frame is first scrambled by a psuedorandom number generator and then an MLT3 encoding scheme is used. The scrambled MLT3 encoded bit stream transmits positive and negative values in a toggled manner with no regard for transmission history. Study showed that the use of 4B5B (a technique for converting 4-bit data elements to 5-bit data elements with error tolerance and framing character requirements taken into account), scrambling, and MLT3 together had the potential to create baseline wander or DC bias. In fact, all known FDDI systems failed when certain valid sequences where applied to them using the 4B5B, scrambling, and MLT3 scheme because baseline wander was too large over time to allow error-free data recovery.

Therefore, a better encoding scheme is needed for twisted pair FDDI systems.

Figure 1:
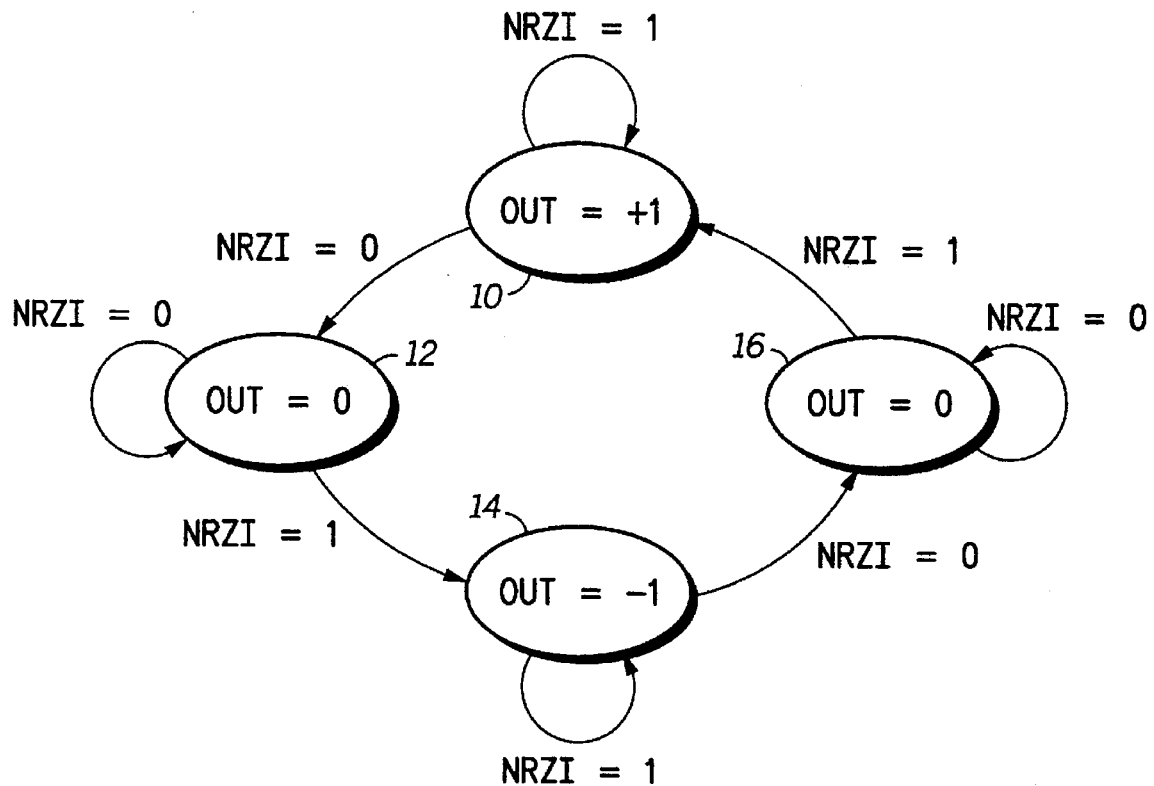
FIG. 1 illustrates, in a state diagram, a known method for encoding data in a fiber data distributed (FDDI) system.

It will be appreciated that for simplicity and clarity of illustration, elements illustrated in the FIGURES have not necessarily been drawn to scale. For example, the dimensions of some of the elements are exaggerated relative to other elements for clarity. Further, where considered appropriate, reference numerals have been repeated among the FIGURES to indicate corresponding or analogous elements.

DESCRIPTION OF A PREFERRED EMBODIMENT

Generally, the present invention provides an apparatus and method for communicating twisted pair fiber distributed data interface (hereafter referred to as FDDI) data serially via serial communication conductors. The FDDI apparatus and method taught herein is improved over prior methods due to the fact that baseline wander (also known as DC bias) is reduced over prior techniques.

In current fiber data distributed interfaces (FDDIs) over twisted pair conductors, an encoding scheme known as MLT3 is used. Extensive FDDI study has uncovered a potentially fatal problem with the MLT3 encoding scheme due to low frequency imbalance. This low frequency imbalance, or baseline wander, makes data recovery costly or impossible in certain circumstances. The new FDDI encoding scheme, referred to as MLT3A herein, eliminates the above listed problem of low frequency imbalance or baseline wander.

Generally, FDDI is a token passing local area network (LAN) technology. MLT3 is a three level encoding scheme used in FDDI LAN systems that lowers RF emissions by approximately 6 dB from the levels generated by a standard non-return to zero inverted (NRZI) encoding scheme in an unshielded twisted pair (UTP) environment. Even though the MLT3 encoding scheme provides advantages, there are data frames that exist in the FDDI protocol which when using the MLT3 scheme will cause unacceptable baseline wander that is severe enough to cause every known FDDI system to fail unless costly and more elaborate receivers were used.

The MLT3 encoding scheme discussed above has a portion of the frequency power spectrum beneath the low frequency cutoff of standard coupling transformer pass-band responses used in FDDI systems. This fact causes extreme distortion preventing data recovery in many cases. In general, MLT3 takes the incoming FDDI NRZI data stream and encodes it into one of three levels. Zeroes are encoded as ground voltages or zero values, and ones are encoded alternately a positive voltage or a negative voltage. Therefore, the MLT3 encoding scheme can be specified in a state machine as illustrated in prior art FIG. 1 herein.

FIG. 1 illustrates a four state diagram with four states illustrated as states 10, 12, 14, and 16. In FIG. 1, there are eight transitions between states illustrated via lines which directionally end in an arrow. Each of these state transitions occur as a function of what input is received when in a particular state in FIG. 1. For example, if an FDDI system is operating currently in state 10 and receives an NRZI input equal to zero, then the MLT3 state diagram in FIG. 1 will transition from state 10 to 12. If while in state 10, the FDDI system using the MLT3 encoding receives an NRZI input equal to one, then the MLT3 state will stay in state 10 as illustrated in FIG. 1. Therefore, in FIG. 1, NRZI is the input to the MLT3 encoding circuit, while OUT is the output of the MLT3 encoding circuit, wherein OUT=0 is a ground voltage for an output, OUT=+1 is a voltage greater than the ground voltage and OUT=−1 is a voltage less than the ground voltage wherein OUT =−1 or +1 both illustrate a logic one value. To further understand how the MLT3 encoding scheme works. The following example is provided.

Example A:

Suppose that the NRZI input to an MLT3 encoding scheme is: 1111101011111010111111010. Given the notation that 0 is (Out=0), 1 is (Out=1) and 2 is (Out=−1) in FIG. 1, the encoded output (OUT) of the MLT3 encoder is as follows:

| Input:  | 1111101011111010111111010 |
| Output: | 1111102011111020111111020 |

As can be seen from the above output serial stream of data, even though the MLT3 encoding scheme alternates between a negative voltage (OUT=−1) and a positive voltage (OUT=+1) (illustrated above via 1's and 2's in Output) there are substantially more positive voltages than negative voltages resulting in baseline wander (i.e., a brief average time period wherein the DC bias of OUT wanders to a positive voltage). In other circumstances the output OUT may be as follows:

| Input:  | 1111101011111010111111010 |
| Output: | 2222201022222010222222010 |

In the above example, the input is the same as illustrated previously but the output OUT contains many more negative voltages (i.e. OUT=−1, illustrated as a 2 in Output above) than positive voltages resulting in a baseline wander to a negative voltage. In either case (a positive baseline wander voltage or negative baseline wander voltage) the wander may be to such a large extent that FDDI data recovery is not possible in a cost-effective and convenient manner. Therefore, even though the MLT3 encoding scheme attempts to balance the baseline wander of the output by using both positive and negative voltages to transmit logic ones, DC bias on the output OUT over time is not avoided to a satisfactory extent.

Figure 2:
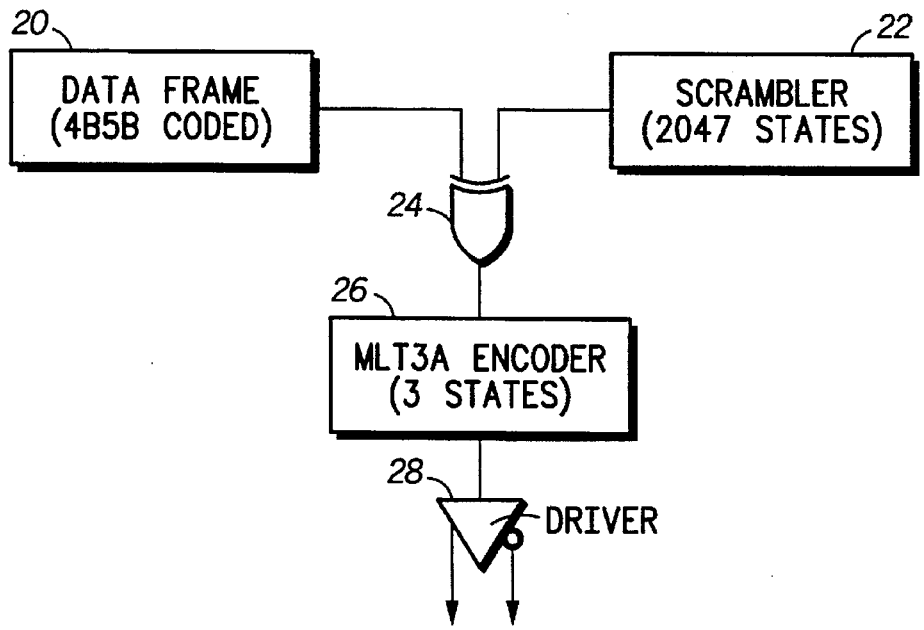
FIG. 2 illustrates, in a block diagram, an FDDI system in accordance with the present invention.

FIG. 2 illustrates an MLT3A encoding scheme which is superior to the MLT3 encoding scheme given that baseline wander is reduced to a point where data recovery is always possible in FDDI systems. FIG. 2 illustrates a data frame circuit 20. Data frame circuit 20 receives as input a 4-Bit FDDI data nibble and converts it to a 5-Bit encoded FDDI format which is referred to as 4B5B coding. A 4-Bit value, as is well known in the art, allows for the representation of 16 states whereas a 5-Bit value allows for the representation of 32 states. The output of circuit 20 is serially transmitted to an XOR gate 24.

A scrambler 22 is illustrated in FIG. 2. The scrambler contains a linear feedback shift register (LFSR) which is used to generate a pseudo-random sequence of bits. This pseudo-random sequence of bits is illustrated in FIG. 2 as providing 2047 states, although any number of states can be provided by the circuit 22 in a pseudo-random fashion. The pseudo-random serial stream from circuit 22 is fed into another input of XOR gate 24 which pseudo-randomizes the serial data stream. An output of XOR gate 24 is coupled to the MLT3A encoder 26. The MLT3A encoder encodes the incoming data stream from XOR gate 24 in a manner which reduces baseline wander or DC bias in a manner which improves upon the known MLT3 encoding. The process performed in encoder 26 is described in greater detail in subsequent figures. The output of the encoder 26 is coupled to a driver 28, which is also known as a transformer. The driver 28 receives from the encoder 27 one or more control signals which indicate whether a ground voltage or zero voltage should be transmitted, a high logic one voltage should be transmitted, or a low logic one voltage should be transmitted. In many cases, the zero voltage is 0 volts, and the logical ones are transmitted as one of either +1 volts or −1 volts although any magnitudes of voltages may be used for transmission. Driver 21 has two outputs wherein one output is a complementary output and the other is a normal output. Therefore, the driver provides not only the normal output signal, but a complementary signal in a twisted pair fashion for serial communication.

Figure 3:
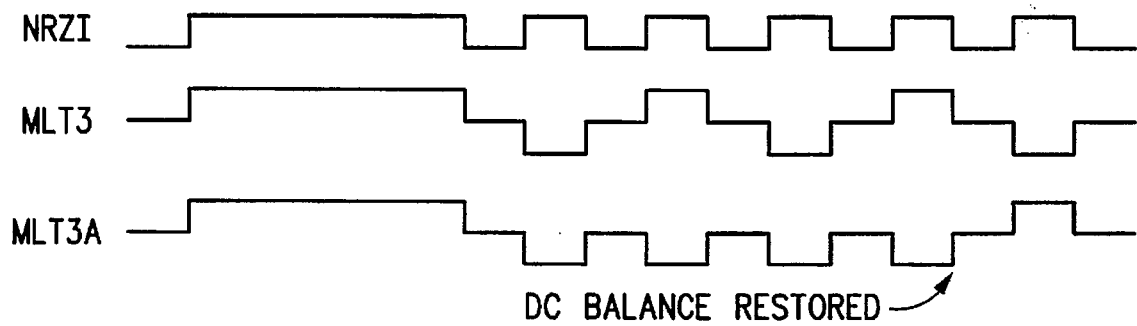
FIG. 3 illustrates, in a timing diagram, various known encoding schemes compared to an encoding scheme which is in accordance with the present invention.

Before discussing MLT3A encoding in detail, a FIG. 3 is provided to illustrate the difference between known NRZI encoding, known MLT3 encoding, and the improved MLT3A encoding disclosed herein. In FIG. 3, the NRZI input is illustrated as being a random serial stream of logic one values and logic zero values. In FIG. 3, the MLT3 encoding of the NRZI input is illustrated in a middle signal. In the MLT3 encoding scheme, all odd occurring logic one sequences in the NRZI input are transmitted as negative logic one voltages, whereas all even occurring logic one sequences in the NRZI input are transmitted as positive logic one voltages as illustrated in FIG. 3 (or vice versa). Therefore, from the NRZI input, all logic ones are transmitted by toggling between a negative transmission value and a positive transmission value without regard for past history or previously transmitted values. In FIG. 3, the improved MLT3A encoding scheme is illustrated. The MLT3A encoding scheme keeps track or stores a history of the transmitted output in order to properly determine which new output value needs to be communicated in order to reduce DC bias or baseline wander.

For example, in FIG. 3 the MLT3A encoding begins by transmitting several logic ones by communicating a positive voltage several times. After the transmission of the several positive voltages to transmit several logic ones, a sequence of NRZI=010101, etc., is encountered as NRZI input. In order to balance the DC bias, or baseline wander for the multiple positive voltages previously transmitted, several negative voltages are transmitted via the MLT3A's encoding scheme until the line is balanced (see the point DC BALANCE RESTORED). Therefore, by remembering that several positive voltages were transmitted for several previous logic ones, the MLT3A encoding can subsequently transmit several negative values for logical ones so that the overall time-based average is relatively close to zero volts. It is important to note, that MLT3A encoding avoids the situation where direct transition between a positive logic one voltage and a negative logic one voltage occurs due to the large voltage change required in a short time period. All transitions from OUT=+1 to OUT=−1 go through an OUT=0 state.

Figure 4:
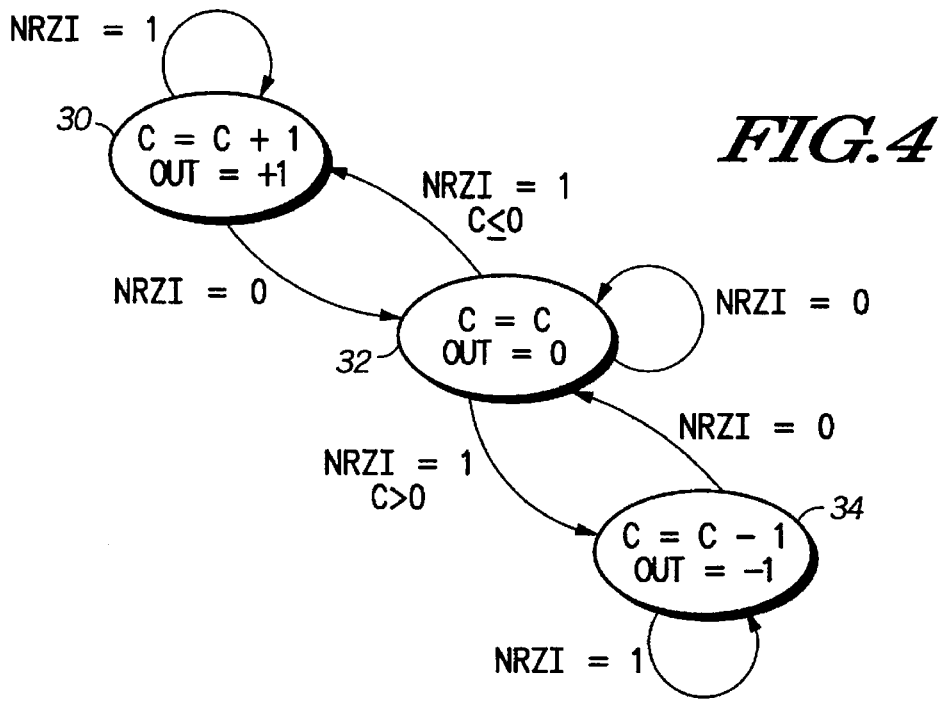
FIG. 4 illustrates, in a state diagram, the MLT3A encoding scheme in accordance with the present invention.

FIG. 4 illustrates a state diagram and discusses a method which may be used to obtain the MLT3A encoding described in FIGS. 2 and 3. FIG. 4 illustrates three possible states illustrated as states 30, 32, and 34. In FIG. 4, seven transitions between states are illustrated via lines ending in arrows wherein the arrows indicate state transition direction. In FIG. 4, there are two types of transitions occurring. One type of transition occurs based only upon the input value NRZI. In other transitions in FIG. 4, a transition between states will occur based upon both NRZI and a count value illustrated as C. C is a counter-value which is incremented every time a positive voltage is output for a logic one and decremented whenever a negative voltage is output for a logic one as illustrated in states 30 and 34 in FIG. 4. While FIG. 4 is illustrated as using a single count value, multiple count values may be used (i.e., one counting OUT=−1 occurrences and another counting OUT=+1 occurrences wherein a comparison between the two counters is needed to determine DC bias information). In another form, analog circuitry may be used or like circuits for storing history. While zeroes or ground voltages are being output in a state 32, the count C remains the same. In order to further understand state diagram in FIG. 4, Example B is provided below.

Example B:

| NRZI Input: | 0001110001111110110101111110001110111101111 |
|---|---|
| MLT3A Out: | 0001110002222220110101111100022220222201111 |
| Count: | 0001233332101233211001234555543211012332101 |

In the above example, an MLT3A output of 1 is equal to OUT=1, an MLT3A output of OUT=0 is equal to a logic zero and an MLT3A output of 2 is equal to OUT=−1. In most cases, an output of 0 is equal to a ground potential and an output of −1 / 1 is −1 volts/+1 volts respectively, although any positive or negative voltage could be chosen as OUT=1 and OUT=−1. For count (C) above, a non-underlined number is a positive count while an underlined number is a negative count. In the above example, the count (C) starts at zero and is incremented for each positive voltage output for an NRZI logic one and is decremented for each negative voltage output for each NRZI logic one. Upon exit of state 32, the count C, if positive, tells the output circuitry to drive a negative logic one value since the line is averaging high/positive at that particular point in time. Upon exiting the state 32, the count, if negative, tells the output circuitry to drive a positive logic one value since the line is averaging low/negative at that particular point in time and needs to be more positive in value. Note that when the count C=0, the output voltage for a logic one can be either −1 or +1 depending upon design choice. Also note in FIG. 4 that there is no way to transition from state 34 to state 30 or vice versa unless state 32 is entered first. This means that there is no possibility of a −1 and a 1 being output in adjacent transmission positions in time.

The state diagram of FIG. 4 illustrates a method wherein a positive or negative count determines which voltage value is output for a logic one for the next sequence and switching from an OUT=−1 to an OUT=1 (or vice versa) only occurs when crossing C=0. In another form, a tolerance range which is near C=0 (e.g. C=2 through −2) may be used as a tolerance range where the DC offset is substantially equal to zero and the output may be chosen to be either OUT=−1 or OUT=+1 due to the substantially zero DC offset.

Figure 5:
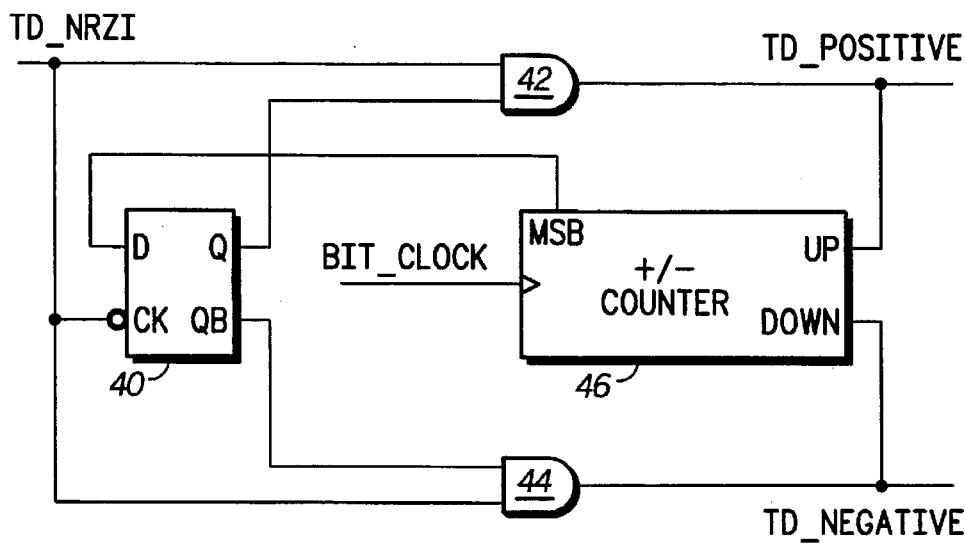
FIG. 5 illustrates, in a block diagram, an MLT3A encoding circuit in accordance with the present invention.

FIG. 5 illustrates an MLT3A encoding circuit which can be used as circuit 26 in FIG. 2. The circuit of FIG. 5 illustrates that a 129-state digital counter (+/−64 states with a state for zero) can be used to implement the count C illustrated previously. The FDDI protocol is such that a 129-state counter will not overflow and therefore cannot result in an inaccurate count at any point in time. FIG. 5 illustrates the NRZI input via a signal TD_NRZI, where the NRZI signal changes on the rising clock edge of Bit_Clock. FIG. 5 illustrates a D flip-flop 40. D flip-flop 40 has a complementary clock connected to the TD_NRZI input which causes it to latch in new output values when there is a 1 to 0 transition on TF_NRZI. D flip-flop 40 has a data input D, an output Q and a complementary output labeled QB. In FIG. 5, an AND gate 42 is illustrated. AND gate 42 has an input coupled to the TD_NRZI signal, a second input coupled to the Q output of D flip-flop 40, and an output labeled TD_positive. TD_positive is a control signal to indicate that the value coming in on the TD_NRZI is to be transmitted as a positive voltage logic one (i.e., OUT=+1).

In FIG. 5 an AND gate 44 has an input coupled to the QB output of the D flip-flop, a second input coupled to the TD_NRZI input, and an output labeled TD_negative. TD_negative is a control signal which indicates that the output to be transmitted should be a negative logic one value (i.e., OUT=−1). When the NRZI signal is a logic zero, an input to both the AND gate 42 and the AND gate 44 is zero, and the outputs TD_positive and TD_negative are therefore both zero. When TD_positive and TD_negative are both zero, a ground voltage is transmitted. In FIG. 5, a counter 46 is illustrated. Counter 46 has a most significant bit labeled MSB, which is connected to the D input of the flip-flop 40. Counter 46 also has an input clock labeled as BIT_CLOCK. The TD_positive control signal is coupled to an input of the counter 46 labeled as UP. The TD_negative control signal is coupled to the counter 46 via an input labeled down (DOWN). When TD_positive is logic one and TD_negative is logic zero, the counter is set to increment on the next positive edge of Bit_clock. When TD_negative is logic one and TD_positive is zero, the counter is set to decrement. When both TD_positive and TD_negative are zero, the counter retains its previous value (i.e., $C_{new}=C_{old}$). Therefore, FIG. 5 can clearly be used to implement the state diagram illustrated in FIG. 4.

Figure 6:
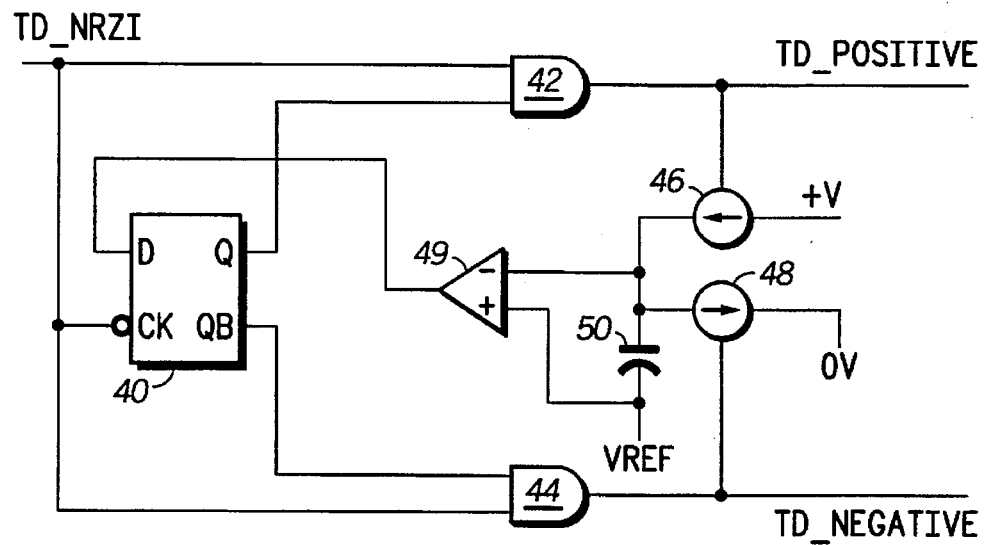
FIG. 6 illustrates, in a block diagram, another MLT3A encoding circuit in accordance with the present invention.

FIG. 6 illustrates a circuit which may be used as the MLT3A encoder 26 in FIG. 2. Unlike FIG. 5, FIG. 6 illustrates an analog approach used to determine whether to transmit a positive logic one value (OUT=+1) or a negative logic one value (OUT=−1). FIG. 6 illustrates the D flip-flop 40 and the AND gates 42 and 44 from FIG. 5, and are not further discussed for FIG. 6 since their functions are analogous. Instead of a 129 state counter, as illustrated in FIG. 5, FIG. 6 uses a selective current source 46, a selective current source 48, a comparator 49, and a capacitor 50. The current source 46 has three terminals. A first terminal is connected to a positive voltage illustrated as +V, a second terminal connected to the control signal TD_positive, and an output is coupled to a negative input of the comparator 49. Control source 48 has a first terminal connected to a zero volts or a ground voltage supply, a second terminal coupled to the TD_negative control signal and a third terminal coupled to the negative input of the comparator 49. Capacitor 50 has a first terminal coupled to the negative input of the comparator 49 and a second terminal coupled to a reference voltage labeled VREF. VREF is typically a voltage between +V and 0V, such as a voltage +V/2. The reference voltage VREF is also coupled to a positive input of the comparator 49. An output of comparator 49 is coupled to the D input of the D flip-flop 40. When TD_positive is a logic one and TD_negative is a logic zero, current source 46 is used to charge capacitor 50, thereby increasing the charge on capacitor 50 with respect to the reference voltage VREF. When TD_negative is a logic one and TD_positive is a logic zero, current source 48 discharges charge from capacitor 50 with respect to voltage reference VREF. The charging and discharging of the capacitor 50 via the current sources 46 and 48 will render the voltage at the negative input of comparator 49 either higher than or lower than the reference voltage VREF coupled to the positive terminal of the comparator 49. Depending upon the relative voltage between positive and negative terminals of the comparator 49, the input to the D flip-flop 40 is set to a logic zero or a logic one in accordance with the state diagram of FIG. 4.

Figure 7:
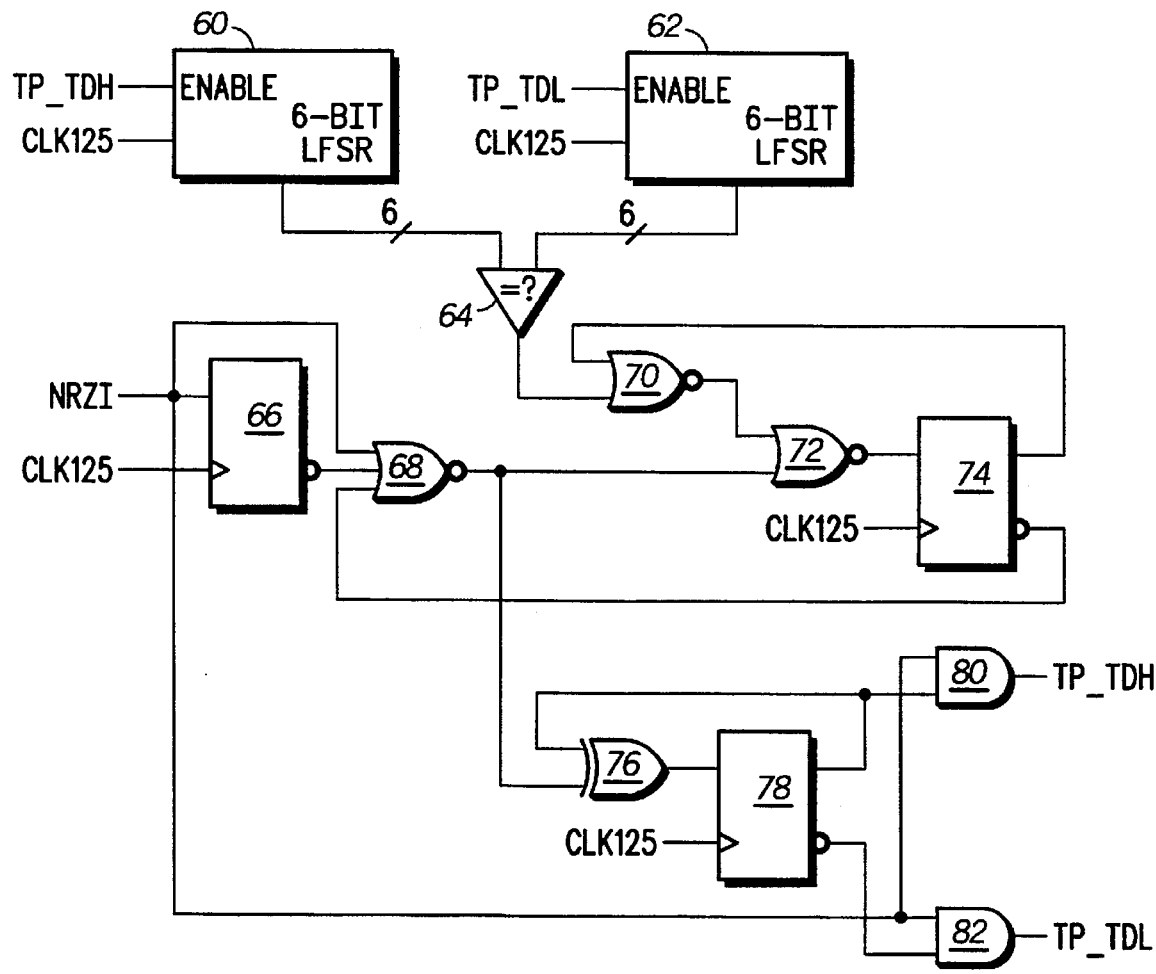
FIG. 7 illustrates, in a block diagram, yet another MLT3A encoding circuit in accordance with the present invention.

Another implementation (see FIG. 7) of the MLT3A circuitry has an input clock, CLK125, and an input signal, NRZI, which contains the NRZI encoded data which switches synchronously to CLK125 which is a clock signal. Two outputs from the circuit, TP_TDH and TP_TDL, are coupled to the external driver circuitry, which in turn puts a 1, 0, or −1 on the twisted pair media as a function of TP_TDH and TP_TDL. A zero in the NRZI data stream will always appear as a 0 on the twisted pair media (usually as a ground voltage or 0 volts), while a logic 1 in the NRZI stream will appear as either a 1 or −1 (usually +v and −v wherein |v| is other than a ground potential) depending on the state of the MLT3A circuitry. If a 1 is to be sent out over the twisted pair, TP_TDH will be high, and TP_TDL will be low. The complement TP_TDH and TP_TDL settings are used for a −1. Zeros are sent with both TP_TDH and TP_TDL low.

Two six-bit Linear Feedback Shift Registers (LFSRs) 60 and 62 are used to monitor the ratio of 1s to −1s that are sent over the twisted pair. Each LFSR 60 and 62 counts through a series of 63 unique 6-bit values. The sequence is repeating, and both LFSRs initialize to the same value and count through the same 63 value sequence. Both LFSRs have CLK125 as their clock input, and each also has an enable signal. LFSR 60 has TP_TDH as its enable input, meaning that the LFSR will advance to the next 6-bit value when a 1 is sent out over the twisted pair. LFSR 62 will advance when a −1 is sent.

The comparator 64 monitors the two LFSRs and will output a high when their 6-bit values are identical. Flip-flop 66 is used to detect a falling edge (1 to 0 transition) in the incoming NRZI bit stream. This information is combined with the output of flip-flop 74, which indicates whether the two LFSRs have matched up some time since the last negative NRZI edge, in order to determine if it is correct to switch between 1 and −1 output values to the twisted pair. This change only occurs on a negative edge. Nor gates 70 and 72 determine whether a match has occurred since the last negative edge, and reset flip-flop 74 when a switch occurs.

Flip-flop 78 holds the state bit that determines how an NRZI one will be sent out over the twisted pair. If flip-flop 78 has a one on its Q output, AND gate 80 will pass NRZI ones to the TP_TDH output. If a one is on the Q inverted output of flip-flop 78, AND gate 82 will allow NRZI ones to pass to TP_TDL output. The XOR 76 before the flop 78 takes the output that indicates it is time to switch from NOR gate 68 and causes flip-flop 78 to toggle.

For example, assume that the circuit has been initialized, and flip-flop 78 has a one on its Q output, indicating that the next one in the NRZI data stream will be output as a 1 on the twisted pair. The two LFSRs are equal, so a match is indicated, and a switch will occur on the next negative edge in the NRZI stream. A group of seven consecutive ones begins the NRZI stream, causing seven consecutive 1s to appear on the TP_TDH signal, and advancing LFSR 60 seven values in its repeating loop. Two zeros follow in the NRZI stream, and both TP_TDH and TP_TDL remain low. The one to zero transition is detected, and flip-flop 78 is toggled and now has a 1 on the inverted Q output. Flip-flop 74 has been cleared by the combinational logic, so no match between the two LFSRs is on record. A group of four ones in the NRZI stream then occur, causing four 1s on TP_TDL, which results in four −1s on the twisted pair, and LFSR 62 advancing four counts. LFSR 62 has not advanced far enough for a match to occur (LFSR 60 is still three values ahead in their identical count loops), and no match is registered in flip-flop 74. A single zero comes next in the NRZI stream. TP_TDL and TP_TDH remain low, and although the negative edge is detected, flip-flop 78 does not change value, as no match has been indicated. Five more ones are next in the NRZI sequence. These ones are all passed through AND 82 to the TP_TDL signal, and LFSR 62 advances five counts, passing the point that LFSR 60 is at. As it passes, a match is recorded, and when the next zero occurs in the NRZI stream, flip-flop 78 is toggled once again. The next batch of ones will be passed through to TP_TDH.

While the present invention has been illustrated and described with reference to specific embodiments, further modifications and improvements will occur to those skilled in the art. For example, the method for DC bias balance taught herein may be used for other communication protocols. There are several ways in which to store history Of previously transmitted values other than counters and analog circuitry. For example, a ring counter, state machine, or memory array may be used. It is taught herein that the logical one value is transmitted in a binary manner (either −1 or +1). In another form, the logical one may be transmitted as a logical zero and the logical zeros may be transmitted as the −1 and +1 to DC balance the output line. In essence, the OUT signal can be "inverted" and achieve a similar purpose.

It is important to note that the encoding scheme taught herein may be used to maintain DC balance in any AC coupled serial communication system. It is to be understood, therefore, that this invention is not limited to the particular forms illustrated and that it is intended in the appended claims to cover all modifications that do not depart from the spirit and scope of this invention.

What is claimed is:

1. An circuit for providing a serial communication data stream comprising:

a first logic gate having a first input for receiving data to be encoded, a second input, and an output for providing a first control signal;

a storage device having a clock input for receiving the data to be encoded, a data input, an output coupled to the second input of the first logic gate, and a complementary output;

a second logic gate having a first input for receiving the data to be encoded, a second input coupled to the complementary output of the storage device, and an output for providing a second control signal; and counting circuitry having a first input for receiving the first control signal, a second input for receiving the second control signal, a clock input for receiving a clock signal, and an output coupled to the data input of the storage device.

2. The encoding circuit of claim 1 wherein the first and second control signals provide one of three outputs signals on an output conductor wherein the one of three output signals is selected from a group consisting of: a first voltage; a second voltage less than the first voltage; and a third voltage greater than the first voltage.

3. The encoding circuit of claim 2 wherein the first voltage is used to indicate a logic zero value and the second and third voltages each represent a logic one value.

4. The encoding circuit of claim 1 wherein the storage device is a D flip-flop.

5. The encoding circuit of claim 1 wherein the counting circuitry is an up/down counter having a plurality of bits.

6. The encoding circuit of claim 1 wherein the first and second control signals are coupled to an output driver which supplies two output signals on two conductors, the two outputs signals being an output value and a complementary value of the output signal.

7. A circuit for communicating a serial stream of data bits, the circuit comprising:

an input for receiving the serial stream of data bits, the serial stream of data bits containing binary data bits wherein each data bit in the serial stream of data bits has one of either a first state or a second state; and circuitry for transforming the serial stream of data bits into a serial stream of encoded bits, the serial stream of encoded bits being transmitted through an output of the circuitry, the encoded bits have a first voltage value which represents the first state and either a second voltage value and a third voltage value which represents the second state, a determination of whether to output the second voltage value or the third voltage value for the second state being made in order to keep an average voltage over time of the output of the circuitry near the first voltage value.

8. The circuit of claim 7 wherein the circuitry for transforming the serial stream of data bits into a serial stream of encoded bits comprises a counter having a plurality of bits.

9. The circuit of claim 7 wherein the circuit is used to transmit fiber data distributed interface (FDDI) data.

10. The circuit of claim 7 wherein the circuitry for transforming the serial stream of data bits into a serial stream of encoded bits comprises a capacitor coupled to an analog comparator element.

11. A circuit for providing a serial stream of data bits, the circuit comprising:
a first logic gate having a first input for receiving data to be encoded, a second input, and an output for providing a first control signal;
a storage device having a clock input for receiving the data to be encoded, a data input, an output coupled to the second input of the first logic gate, and a complementary output;
a second logic gate having a first input for receiving the data to be encoded, a second input coupled to the complementary output of the storage device, and an output for providing a second control signal; and
analog circuitry having a first input for receiving the first control signal, a second input for receiving the second control signal, and an output coupled to the data input of the storage device.

12. The circuit of claim 11 wherein the analog circuitry comprises:
a comparator having a first input, a second input and an output coupled to the data input of the storage device;
a first current controlling device having a first terminal coupled to a positive voltage, a second terminal coupled to the first input of the comparator, and an input for receiving the first control signal;
a second current controlling device having a first terminal coupled to a ground voltage, a second terminal, and an input for receiving the second control signal; and
a capacitor having a first terminal coupled to the second terminal of the second current controlling device and a second terminal being coupled to both a reference voltage and the second input of the comparator.

13. The circuit of claim 11 wherein the analog circuitry comprises:
a comparator having a first input to receive a voltage which is altered in response to the serial stream of data bits, a second input for receiving a reference voltage, and an output coupled to the data input of the storage device.

14. A circuit for determining a transmission voltage to transmit, the circuit comprising:
a first counter for counting a number of negative voltages transmitted as the transmission voltage from a selected initial point in time;
a second counter for counting a number of positive voltages transmitted as the transmission voltage from the selected initial point in time;

a compare circuit for determining when the first and second counter have attained counts wherein the number of negative voltages is equal to the number of positive voltages; and
storage circuitry for toggling a control signal wherein the control signal determines whether the transmission voltage is a negative voltage or a positive voltage, the storage circuitry being toggled in response to the compare circuitry attaining counts wherein the number of negative voltages is equal to the number of positive voltages.

15. The circuit of claim 14 wherein the control signal comprises a plurality of control signals.

16. The circuit of claim 14 wherein the control signal is coupled to a circuit which transmits one of three output voltages at a given time, a first output voltage representing a logical zero and a second and third output voltage representing a logical one.

17. The circuit of claim 14 wherein the control signal is coupled to a circuit which transmits one of three output voltages at a given time, a first output voltage representing a logical one and a second and third output voltage representing a logical zero.

18. A local area network physical interface having an output, the local area network comprising:
a data input for providing a data input stream comprising logic one values represented by a first voltage and logic zero values represented as a second voltage; and
a encoder which receives as input the data input stream and converts the first voltage to one of either an encoded positive voltage or an encoded negative voltage for output as output voltages, either the encoded positive voltage or encoded negative voltage being selected to minimize DC bias on the output over time in response to a history of a plurality previously transmitted output voltages on the output, the output never transitioning directly between the encoded negative voltage and the encoded positive voltage.

19. A fiber data distributed interface (FDDI) method for communicating a serial stream of data bits, the method comprising the steps of:
receiving an input serial stream of data bits wherein the input serial stream of data bits comprise first input voltage values and second input voltage values;
transforming the input serial stream of data bits to an output serial stream of data bits wherein the first input voltage values are transformed to a first output voltage value and the second input voltage values are transformed to one of either a second output voltage value or a third output voltage value;
storing, in a storage circuit, a history of the output serial stream of data bits wherein the history keeps record of a number of transmissions of the second output voltage value with respect to the third output voltage value over time; and
accessing the storage circuit each time a second input voltage value is received to determine whether to output the second output voltage value or third output voltage value.

20. The method of claim 19 wherein the step of accessing is used choose one of either the second output voltage value or third output voltage value in a manner which, over time, reduces a DC bias of an output.

21. The method of claim 19 wherein the step of accessing is used choose one of either the second output voltage value or third output voltage value in a manner which, over time, keeps an average voltage of an output line close to the first output voltage.

22. A method for communicating an input serial stream of data bits, the method comprising the steps of:

receiving the input serial stream of data bits wherein the input serial stream of data bits comprises logic one values and logic zero values; and transforming the input serial stream of data bits to an output serial stream of data bits which is communicated via an output, the output serial stream of data bits comprising a logic zero output voltage value, a first logic one output voltage value, and a second logic one output voltage value, each logic one value in the input serial stream of data bits being transformed to one of either the first logic one output voltage value or the second logic one output voltage value based upon a history of past output data bits, a choice of either the first logic one output voltage value or the second logic one output voltage value being made to reduce a base line wander of the output over time.

23. The method of claim 22 wherein the input serial stream of data bits are fiber data distributed interface (FDDI) data bits which are encoded.

24. The method of claim 22 wherein the step of transforming comprises:

storing the history in a circuit wherein the circuit is accessed to determine, over a certain time period, whether more first logic one output voltage values have been transmitted in the certain time period than second logic one output voltage values, if more first logic one output voltage values have been transmitted in the certain time period than second logic one output voltage values then the second logic one output voltage value is sent to represent a next logic one value, otherwise the first logic one output voltage value is sent to represent the next logic one value.

25. A method for communicating a serial stream of data bits, the method comprising the steps of:

receiving an input serial stream of data bits wherein the input serial stream of data bits contains data values from a binary system comprising a low voltage and a high voltage which is greater than the low voltage; and transforming the input serial stream of data bits to an output serial stream of data bits wherein the output serial stream of data bits contains values from a ternary system, a first value in the ternary system being used to represent the low voltage, a second value and a third value in the ternary system being used to represent the high voltage wherein the second value is less than the first value in the ternary system and the third value is greater than the first value in the ternary system, the second and third value in the ternary system being selectively chosen for output as the high voltage via a stored history of previously output second and third values.

26. The method of claim 25 wherein the input serial stream of data bits are fiber data distributed interface (FDDI) data bits which are encoded.

27. The method of claim 25 wherein the step of transforming comprises:

storing the stored history in a circuit wherein the circuit is accessed to determine, over a certain period of time, whether more second values have been transmitted in the certain period of time than third values, if more second values have been transmitted in the certain period of time than third values then the third value is sent to represent a next high voltage in the input serial stream of data bits, otherwise the third value is sent to represent the next high voltage in the input serial stream of data bits.

* * * * *